United States Patent
Gupta et al.

(10) Patent No.: US 11,899,782 B1
(45) Date of Patent: Feb. 13, 2024

(54) PRESERVING DLL HOOKS

(71) Applicant: SentinelOne, Inc., Mountain View, CA (US)

(72) Inventors: Anil Gupta, Bangalore (IN); Harinath Vishwanath Ramchetty, Bangalore (IN)

(73) Assignee: SentinelOne, Inc., Mountain View, CA (US)

( * ) Notice: Subject to any disclaimer, the term of this patent is extended or adjusted under 35 U.S.C. 154(b) by 230 days.

(21) Appl. No.: 17/374,087

(22) Filed: Jul. 13, 2021

(51) Int. Cl.
*G06F 21/54* (2013.01)
*G06F 21/55* (2013.01)
*G06F 21/57* (2013.01)

(52) U.S. Cl.
CPC ............ *G06F 21/54* (2013.01); *G06F 21/554* (2013.01); *G06F 21/577* (2013.01)

(58) Field of Classification Search
CPC ....... G06F 21/54; G06F 21/554; G06F 21/577
See application file for complete search history.

(56) References Cited

U.S. PATENT DOCUMENTS

| | | | |
|---|---|---|---|
| 4,979,118 A | 12/1990 | Kheradpir | |
| 5,311,593 A | 5/1994 | Carmi | |
| 6,154,844 A | 11/2000 | Touboul et al. | |
| 6,157,953 A | 12/2000 | Chang et al. | |
| 6,728,716 B1 | 4/2004 | Bhattacharya et al. | |
| 6,804,780 B1 | 10/2004 | Touboul | |
| 6,836,888 B1 | 12/2004 | Basu et al. | |
| 7,076,696 B1 | 7/2006 | Stringer | |
| 7,093,239 B1 | 8/2006 | Van der Made | |
| 7,181,769 B1 | 2/2007 | Keanini et al. | |
| 7,225,468 B2 | 5/2007 | Waisman et al. | |
| 7,299,294 B1 | 11/2007 | Bruck et al. | |
| 7,305,546 B1 | 12/2007 | Miller | |
| 7,322,044 B2 | 1/2008 | Hrastar | |
| 7,464,407 B2 | 12/2008 | Nakae et al. | |

(Continued)

FOREIGN PATENT DOCUMENTS

| | | | |
|---|---|---|---|
| CN | 103607399 A | 2/2014 | |
| CN | 109446755 A * | 3/2019 | ........... G06F 21/121 |

(Continued)

OTHER PUBLICATIONS

Wataru Matsuda • Mariko Fujimoto • Takuho Mitsunaga; Real-Time Detection System Against Malicious Tools by Monitoring DLL on Client Computersl; 2019 IEEE Conference on Application, Information and Network Security (AINS) (pp. 36-41); (Year: 2019).*

(Continued)

*Primary Examiner* — Luu T Pham
*Assistant Examiner* — Chao Wang
(74) *Attorney, Agent, or Firm* — Perkins Coie LLP

(57) ABSTRACT

DLL hooks are protected by mapping the starting address of the new executable to a sample of the former executable. Attempts to read the starting address are responded to with the sample of the former executable. Attempts to write to the starting address are responded to with confirmation of success without actually writing data. Debuggers are detected upon launch or by evaluating an operating system. A component executing in the kernel denies debugging privileges to prevent inspection and modification of DLL hooks.

18 Claims, 9 Drawing Sheets

(56) References Cited

U.S. PATENT DOCUMENTS

| | | | |
|---|---|---|---|
| 7,530,106 | B1 | 5/2009 | Zaitsev et al. |
| 7,543,269 | B2 | 6/2009 | Krueger |
| 7,546,587 | B2 | 6/2009 | Marr et al. |
| 7,574,740 | B1 | 8/2009 | Kennis |
| 7,596,807 | B2 | 9/2009 | Ptacek et al. |
| 7,596,808 | B1 | 9/2009 | Wilkinson et al. |
| 7,665,139 | B1 * | 2/2010 | Szor .................... G06F 21/56 713/188 |
| 7,710,933 | B1 | 5/2010 | Sundaralingam et al. |
| 7,739,516 | B2 | 6/2010 | Bender et al. |
| 7,832,012 | B2 | 11/2010 | Huddleston |
| 7,882,538 | B1 | 2/2011 | Palmer |
| 7,890,612 | B2 | 2/2011 | Todd et al. |
| 7,937,755 | B1 | 5/2011 | Guruswamy |
| 7,958,549 | B2 | 6/2011 | Nakae et al. |
| 7,984,129 | B2 | 7/2011 | Vaught |
| 8,015,605 | B2 | 9/2011 | Yegneswaran |
| 8,024,795 | B2 | 9/2011 | Newton |
| 8,042,186 | B1 | 10/2011 | Polyakov et al. |
| 8,065,722 | B2 | 11/2011 | Barford et al. |
| 8,078,556 | B2 | 12/2011 | Adi et al. |
| 8,082,471 | B2 | 12/2011 | Khan |
| 8,131,281 | B1 | 3/2012 | Hildner et al. |
| 8,141,154 | B2 | 3/2012 | Gruzman et al. |
| 8,156,556 | B2 | 4/2012 | Krishnamurthy |
| 8,171,545 | B1 | 5/2012 | Cooley et al. |
| 8,181,033 | B1 | 5/2012 | Paul et al. |
| 8,181,250 | B2 | 5/2012 | Rafalovich et al. |
| 8,204,984 | B1 | 6/2012 | Aziz |
| 8,205,035 | B2 | 6/2012 | Reddy et al. |
| 8,230,505 | B1 | 7/2012 | Ahrens et al. |
| 8,239,947 | B1 * | 8/2012 | Glick ..................... G06F 21/52 713/153 |
| 8,296,842 | B2 | 10/2012 | Singh et al. |
| 8,327,442 | B2 | 12/2012 | Herz et al. |
| 8,353,033 | B1 | 1/2013 | Chen et al. |
| 8,370,931 | B1 | 2/2013 | Chien et al. |
| 8,375,444 | B2 | 2/2013 | Aziz et al. |
| 8,375,447 | B2 | 2/2013 | Amoroso et al. |
| 8,413,238 | B1 | 4/2013 | Sutton |
| 8,413,241 | B1 | 4/2013 | Weeks et al. |
| 8,418,250 | B2 | 4/2013 | Morris et al. |
| 8,438,386 | B2 | 5/2013 | Hegli et al. |
| 8,438,626 | B2 | 5/2013 | Anderson et al. |
| 8,443,442 | B2 | 5/2013 | Wang et al. |
| 8,474,044 | B2 | 6/2013 | Zawadowskiy et al. |
| 8,488,466 | B2 | 7/2013 | Breslin et al. |
| 8,528,057 | B1 | 9/2013 | Garrett |
| 8,528,087 | B2 | 9/2013 | Hsu et al. |
| 8,538,578 | B2 | 9/2013 | Battles et al. |
| 8,539,582 | B1 | 9/2013 | Aziz et al. |
| 8,549,643 | B1 | 10/2013 | Shou |
| 8,555,385 | B1 | 10/2013 | Bhatkar et al. |
| 8,561,177 | B1 | 10/2013 | Aziz et al. |
| 8,566,946 | B1 | 10/2013 | Aziz et al. |
| 8,607,054 | B2 | 12/2013 | Ramarathinam et al. |
| 8,607,340 | B2 | 12/2013 | Wright |
| 8,627,475 | B2 | 1/2014 | Loveland et al. |
| 8,677,494 | B2 | 3/2014 | Edery et al. |
| 8,713,306 | B1 | 4/2014 | Bennett |
| 8,719,937 | B2 | 5/2014 | Sundaram et al. |
| 8,725,898 | B1 | 5/2014 | Vincent |
| 8,726,389 | B2 | 5/2014 | Morris et al. |
| 8,732,296 | B1 | 5/2014 | Thomas et al. |
| 8,752,173 | B2 | 6/2014 | Yadav |
| 8,789,135 | B1 | 7/2014 | Pani |
| 8,793,151 | B2 | 7/2014 | Delzoppo et al. |
| 8,821,242 | B2 | 9/2014 | Hinman et al. |
| 8,839,369 | B1 | 9/2014 | Dai et al. |
| 8,849,880 | B2 | 9/2014 | Thelen |
| 8,850,582 | B2 | 9/2014 | Endoh et al. |
| 8,880,435 | B1 | 11/2014 | Catlett et al. |
| 8,881,282 | B1 | 11/2014 | Aziz et al. |
| 8,893,278 | B1 | 11/2014 | Chechik |
| 8,898,788 | B1 | 11/2014 | Aziz et al. |
| 8,904,527 | B2 | 12/2014 | Dawson et al. |
| 8,943,594 | B1 | 1/2015 | Arrowood |
| 8,949,986 | B2 | 2/2015 | Ben-Shalom |
| 8,959,338 | B2 | 2/2015 | Snow et al. |
| 8,973,142 | B2 | 3/2015 | Shulman et al. |
| 8,984,637 | B2 | 3/2015 | Karecha et al. |
| 9,009,829 | B2 | 4/2015 | Stolfo et al. |
| 9,027,135 | B1 | 5/2015 | Aziz |
| 9,043,920 | B2 | 5/2015 | Gula et al. |
| 9,117,078 | B1 | 8/2015 | Chien et al. |
| 9,141,792 | B2 | 9/2015 | Baluda et al. |
| 9,166,993 | B1 | 10/2015 | Liu |
| 9,185,136 | B2 | 11/2015 | Dulkin et al. |
| 9,197,601 | B2 | 11/2015 | Pasdar |
| 9,213,838 | B2 | 12/2015 | Lu |
| 9,225,734 | B1 | 12/2015 | Hastings |
| 9,240,976 | B1 | 1/2016 | Murchison |
| 9,246,774 | B2 | 1/2016 | Mataitis et al. |
| 9,270,690 | B2 | 2/2016 | Kraitsman et al. |
| 9,305,165 | B2 | 4/2016 | Snow et al. |
| 9,329,973 | B2 | 5/2016 | Bhuyan |
| 9,330,259 | B2 | 5/2016 | Klein et al. |
| 9,356,942 | B1 | 5/2016 | Joffe |
| 9,356,950 | B2 | 5/2016 | Vissamsetty et al. |
| 9,369,476 | B2 | 6/2016 | Chekina et al. |
| 9,386,034 | B2 | 7/2016 | Cochenour |
| 9,398,001 | B1 | 7/2016 | Tidd |
| 9,407,602 | B2 | 7/2016 | Feghali et al. |
| 9,413,721 | B2 | 8/2016 | Morris et al. |
| 9,430,646 | B1 | 8/2016 | Mushtaq et al. |
| 9,432,360 | B1 | 8/2016 | Triandopoulos et al. |
| 9,438,614 | B2 | 9/2016 | Herz |
| 9,495,188 | B1 | 11/2016 | Ettema et al. |
| 9,503,470 | B2 | 11/2016 | Gertner et al. |
| 9,547,516 | B2 | 1/2017 | Thakkar et al. |
| 9,578,045 | B2 | 2/2017 | Jaroch et al. |
| 9,591,006 | B2 | 3/2017 | Siva et al. |
| 9,601,000 | B1 | 3/2017 | Gruss et al. |
| 9,602,531 | B1 | 3/2017 | Wallace et al. |
| 9,606,893 | B2 | 3/2017 | Gupta et al. |
| 9,607,146 | B2 | 3/2017 | Sridhara et al. |
| 9,609,019 | B2 | 3/2017 | Vissamsetty et al. |
| 9,628,498 | B1 | 4/2017 | Aziz et al. |
| 9,641,544 | B1 | 5/2017 | Treat et al. |
| 9,641,550 | B2 | 5/2017 | Kraitsman et al. |
| 9,710,648 | B2 | 7/2017 | Weingarten |
| 9,712,547 | B2 | 7/2017 | Touboul et al. |
| 9,769,204 | B2 | 8/2017 | Vissamsetty et al. |
| 9,781,148 | B2 | 10/2017 | Mahaffey et al. |
| 9,807,092 | B1 | 10/2017 | Gutzmann |
| 9,807,115 | B2 | 10/2017 | Kolton et al. |
| 9,813,451 | B2 | 11/2017 | Honda et al. |
| 9,871,766 | B2 | 1/2018 | Syed et al. |
| 9,877,210 | B1 | 1/2018 | Hildner et al. |
| 9,888,032 | B2 | 2/2018 | Dekel et al. |
| 9,898,763 | B1 | 2/2018 | Vaynblat et al. |
| 9,942,270 | B2 | 3/2018 | Vissamsetty et al. |
| 10,025,928 | B2 | 7/2018 | Jaroch et al. |
| 10,044,675 | B1 | 8/2018 | Ettema et al. |
| 10,102,374 | B1 | 10/2018 | Cohen et al. |
| 10,169,586 | B2 | 1/2019 | Maciejak et al. |
| 10,237,282 | B2 | 3/2019 | Nelson et al. |
| 10,250,636 | B2 | 4/2019 | Vissamsetty et al. |
| 10,257,224 | B2 | 4/2019 | Jaroch et al. |
| 10,284,591 | B2 | 5/2019 | Giuliani et al. |
| 10,375,110 | B2 | 7/2019 | Vissamsetty et al. |
| 10,382,484 | B2 | 8/2019 | Shayevitz et al. |
| 10,476,891 | B2 | 11/2019 | Vissamsetty et al. |
| 10,509,905 | B2 | 12/2019 | Vissamsetty et al. |
| 10,542,044 | B2 | 1/2020 | Vissamsetty et al. |
| 10,567,431 | B2 | 1/2020 | Vissamsetty et al. |
| 10,574,698 | B1 | 2/2020 | Sharifi |
| 10,599,842 | B2 | 3/2020 | Vissamsetty et al. |
| 10,599,844 | B2 | 3/2020 | Schmidtler et al. |
| 10,609,074 | B2 | 3/2020 | Vissamsetty et al. |
| 10,757,090 | B2 | 8/2020 | Kahol et al. |
| 10,826,941 | B2 | 11/2020 | Jain et al. |
| 10,855,671 | B2 | 12/2020 | Kahol et al. |
| 10,938,854 | B2 | 3/2021 | Strogov et al. |

(56) References Cited

U.S. PATENT DOCUMENTS

| | | |
|---|---|---|
| 11,032,301 B2 | 6/2021 | Mandrychenko et al. |
| 11,038,658 B2 | 6/2021 | Vissamsetty et al. |
| 11,171,974 B2 | 11/2021 | Gertner et al. |
| 11,470,115 B2 | 10/2022 | Vissamsetty et al. |
| 2002/0010800 A1 | 1/2002 | Riley et al. |
| 2002/0016826 A1 | 2/2002 | Johansson et al. |
| 2002/0078382 A1 | 6/2002 | Sheikh et al. |
| 2002/0093917 A1 | 7/2002 | Knobbe et al. |
| 2002/0095607 A1 | 7/2002 | Lin-Hendel |
| 2002/0178374 A1 | 11/2002 | Swimmer et al. |
| 2002/0194489 A1 | 12/2002 | Almogy et al. |
| 2003/0065950 A1 | 4/2003 | Yarborough |
| 2003/0145225 A1 | 7/2003 | Bruton, III et al. |
| 2003/0145226 A1 | 7/2003 | Bruton, III et al. |
| 2003/0152034 A1 | 8/2003 | Zhang et al. |
| 2003/0188189 A1 | 10/2003 | Desai et al. |
| 2003/0223367 A1 | 12/2003 | Shay et al. |
| 2004/0083369 A1 | 4/2004 | Erlingsson et al. |
| 2004/0172557 A1 | 9/2004 | Nakae et al. |
| 2004/0243699 A1 | 12/2004 | Koclanes et al. |
| 2004/0255157 A1 | 12/2004 | Ghanea-Hercock |
| 2005/0050353 A1 | 3/2005 | Thiele et al. |
| 2005/0076235 A1 | 4/2005 | Ormazabal et al. |
| 2005/0076238 A1 | 4/2005 | Ormazabal et al. |
| 2005/0108562 A1 | 5/2005 | Khazan et al. |
| 2005/0138402 A1 | 6/2005 | Yoon et al. |
| 2005/0204157 A1 | 9/2005 | Johnson |
| 2005/0223239 A1 | 10/2005 | Dotan |
| 2005/0240989 A1 | 10/2005 | Kim et al. |
| 2006/0085543 A1 | 4/2006 | Hrastar |
| 2006/0101515 A1 | 5/2006 | Amoroso et al. |
| 2006/0126522 A1 | 6/2006 | Oh |
| 2006/0161989 A1 | 7/2006 | Reshef et al. |
| 2006/0203774 A1 | 9/2006 | Carrion-Rodrigo |
| 2006/0209701 A1 | 9/2006 | Zhang et al. |
| 2006/0230129 A1 | 10/2006 | Swami et al. |
| 2006/0236401 A1 | 10/2006 | Fosdick |
| 2007/0022090 A1 | 1/2007 | Graham |
| 2007/0025374 A1 | 2/2007 | Stefan et al. |
| 2007/0067623 A1 | 3/2007 | Ward |
| 2007/0097976 A1 | 5/2007 | Wood et al. |
| 2007/0100905 A1 | 5/2007 | Masters et al. |
| 2007/0101431 A1 | 5/2007 | Clift et al. |
| 2007/0115993 A1 | 5/2007 | Cohen |
| 2007/0143827 A1 | 6/2007 | Nicodemus et al. |
| 2007/0143851 A1 | 6/2007 | Nicodemus et al. |
| 2007/0177499 A1 | 8/2007 | Gavrilescu et al. |
| 2007/0208822 A1 | 9/2007 | Wang et al. |
| 2007/0208936 A1 | 9/2007 | Ramos |
| 2007/0209070 A1 | 9/2007 | Yadav |
| 2007/0226320 A1 | 9/2007 | Hager et al. |
| 2007/0240215 A1 | 10/2007 | Flores et al. |
| 2007/0250930 A1 | 10/2007 | Aziz et al. |
| 2007/0282782 A1 | 12/2007 | Carey et al. |
| 2008/0005782 A1 | 1/2008 | Aziz |
| 2008/0018927 A1 | 1/2008 | Martin et al. |
| 2008/0022000 A1 | 1/2008 | Furuya et al. |
| 2008/0034429 A1 | 2/2008 | Schneider |
| 2008/0046989 A1 | 2/2008 | Wahl |
| 2008/0060074 A1 | 3/2008 | Okuyama |
| 2008/0071728 A1 | 3/2008 | Lim |
| 2008/0082722 A1 | 4/2008 | Savagaonkar et al. |
| 2008/0083034 A1 | 4/2008 | Kim et al. |
| 2008/0098476 A1 | 4/2008 | Syversen |
| 2008/0104046 A1 | 5/2008 | Singla et al. |
| 2008/0127346 A1 | 5/2008 | Oh et al. |
| 2008/0162397 A1 | 7/2008 | Zaltzman |
| 2008/0168559 A1 | 7/2008 | Touitou et al. |
| 2008/0170566 A1 | 7/2008 | Akimoto |
| 2008/0229415 A1 | 9/2008 | Kapoor et al. |
| 2009/0077664 A1 | 3/2009 | Hsu et al. |
| 2009/0089040 A1 | 4/2009 | Monastyrsky et al. |
| 2009/0104046 A1 | 4/2009 | Martin et al. |
| 2009/0158407 A1 | 6/2009 | Nicodemus et al. |
| 2009/0158418 A1 | 6/2009 | Rao et al. |
| 2009/0170566 A1 | 7/2009 | Kwon et al. |
| 2009/0199296 A1 | 8/2009 | Xie et al. |
| 2009/0241173 A1 | 9/2009 | Troyansky |
| 2009/0249466 A1 | 10/2009 | Motil et al. |
| 2009/0249470 A1 | 10/2009 | Litvin et al. |
| 2009/0254973 A1 | 10/2009 | Kwan |
| 2009/0288158 A1 | 11/2009 | Izatt et al. |
| 2009/0296641 A1 | 12/2009 | Bienas et al. |
| 2009/0327688 A1 | 12/2009 | Li et al. |
| 2009/0328196 A1 | 12/2009 | Bovee |
| 2010/0005339 A1 | 1/2010 | Hooks |
| 2010/0077483 A1 | 3/2010 | Stolfo et al. |
| 2010/0122317 A1 | 5/2010 | Yadav |
| 2010/0122343 A1 | 5/2010 | Ghosh et al. |
| 2010/0169973 A1 | 7/2010 | Kim et al. |
| 2010/0269175 A1 | 10/2010 | Stolfo et al. |
| 2010/0293615 A1 | 11/2010 | Ye |
| 2010/0299430 A1 | 11/2010 | Powers et al. |
| 2011/0023118 A1 | 1/2011 | Wright et al. |
| 2011/0067107 A1 | 3/2011 | Weeks et al. |
| 2011/0078309 A1 | 3/2011 | Bloch |
| 2011/0099633 A1 | 4/2011 | Aziz |
| 2011/0113427 A1 | 5/2011 | Dotan |
| 2011/0138456 A1 | 6/2011 | Ormazabal et al. |
| 2011/0141937 A1 | 6/2011 | Breslin et al. |
| 2011/0145920 A1 | 6/2011 | Mahaffey et al. |
| 2011/0167494 A1 | 7/2011 | Bowen |
| 2011/0178930 A1 | 7/2011 | Scheidt et al. |
| 2011/0185430 A1 | 7/2011 | Sallam |
| 2011/0214176 A1 | 9/2011 | Burch et al. |
| 2011/0214182 A1 | 9/2011 | Adams et al. |
| 2011/0219443 A1 | 9/2011 | Hampel |
| 2011/0219449 A1 | 9/2011 | St. Neitzel |
| 2011/0247071 A1 | 10/2011 | Hooks et al. |
| 2011/0271341 A1 | 11/2011 | Satish et al. |
| 2011/0288940 A1 | 11/2011 | Hordan et al. |
| 2012/0023572 A1 | 1/2012 | William, Jr. et al. |
| 2012/0030745 A1 | 2/2012 | Bauer |
| 2012/0030750 A1 | 2/2012 | Bhargava et al. |
| 2012/0079596 A1 | 3/2012 | Thomas et al. |
| 2012/0084866 A1 | 4/2012 | Stolfo |
| 2012/0106377 A1 | 5/2012 | Sommers et al. |
| 2012/0124363 A1 | 5/2012 | Dietrich et al. |
| 2012/0137342 A1 | 5/2012 | Hartrell et al. |
| 2012/0137367 A1 | 5/2012 | Dupont et al. |
| 2012/0144488 A1 | 6/2012 | Sankruthi |
| 2012/0151565 A1 | 6/2012 | Fiterman |
| 2012/0185563 A1 | 7/2012 | Sugiyama et al. |
| 2012/0240182 A1 | 9/2012 | Marayanaswamy et al. |
| 2012/0255003 A1 | 10/2012 | Sallam |
| 2012/0255004 A1 | 10/2012 | Sallam |
| 2012/0291090 A1 | 11/2012 | Srinivasan et al. |
| 2012/0297488 A1 | 11/2012 | Kapoor et al. |
| 2012/0324094 A1 | 12/2012 | Wyatt et al. |
| 2012/0331553 A1 | 12/2012 | Aziz et al. |
| 2013/0052992 A1 | 2/2013 | Lee et al. |
| 2013/0061097 A1 | 3/2013 | Mendel et al. |
| 2013/0080641 A1 | 3/2013 | Lui et al. |
| 2013/0086684 A1 | 4/2013 | Mohler |
| 2013/0091573 A1 | 4/2013 | Herz et al. |
| 2013/0097706 A1 | 4/2013 | Titonis et al. |
| 2013/0111547 A1 | 5/2013 | Kraemer |
| 2013/0133072 A1 | 5/2013 | Kraitsman et al. |
| 2013/0152200 A1 | 6/2013 | Alme et al. |
| 2013/0167236 A1 | 6/2013 | Sick |
| 2013/0191924 A1 | 7/2013 | Tedesco et al. |
| 2013/0212658 A1 | 8/2013 | Amaya et al. |
| 2013/0219217 A1 | 8/2013 | Seren et al. |
| 2013/0231084 A1 | 9/2013 | Raleigh |
| 2013/0242743 A1 | 9/2013 | Thomas et al. |
| 2013/0247190 A1 | 9/2013 | Spurlock |
| 2013/0290662 A1 | 10/2013 | Teal |
| 2013/0290729 A1 | 10/2013 | Pettigrew et al. |
| 2013/0291111 A1 | 10/2013 | Zhou et al. |
| 2013/0298192 A1 | 11/2013 | Kumar et al. |
| 2013/0298244 A1 | 11/2013 | Kumar et al. |
| 2013/0329732 A1 | 12/2013 | Vyas et al. |
| 2013/0333040 A1 | 12/2013 | Diehl et al. |
| 2013/0340033 A1 | 12/2013 | Jones et al. |

(56) References Cited

U.S. PATENT DOCUMENTS

| | | |
|---|---|---|
| 2013/0346472 A1 | 12/2013 | Wheeldon |
| 2013/0347052 A1 | 12/2013 | Choudrie |
| 2014/0046645 A1 | 2/2014 | White et al. |
| 2014/0053267 A1 | 2/2014 | Klein et al. |
| 2014/0068326 A1 | 3/2014 | Quinn |
| 2014/0068779 A1 | 3/2014 | Tan et al. |
| 2014/0090061 A1 | 3/2014 | Avasarala et al. |
| 2014/0096229 A1 | 4/2014 | Burns et al. |
| 2014/0108794 A1 | 4/2014 | Barton et al. |
| 2014/0123280 A1 | 5/2014 | Kedma |
| 2014/0137246 A1 | 5/2014 | Baluda |
| 2014/0150094 A1 | 5/2014 | Rao et al. |
| 2014/0157366 A1 | 6/2014 | Ko et al. |
| 2014/0165203 A1 | 6/2014 | Friedrichs et al. |
| 2014/0215617 A1 | 7/2014 | Smith et al. |
| 2014/0215621 A1 | 7/2014 | Xaypanya et al. |
| 2014/0215625 A1 | 7/2014 | Paul et al. |
| 2014/0237562 A1 | 8/2014 | Nandakumar |
| 2014/0237595 A1 | 8/2014 | Sridhara et al. |
| 2014/0237599 A1 | 8/2014 | Gertner et al. |
| 2014/0245376 A1 | 8/2014 | Hibbert et al. |
| 2014/0250524 A1 | 9/2014 | Meyers et al. |
| 2014/0259092 A1 | 9/2014 | Boucher et al. |
| 2014/0282816 A1 | 9/2014 | Xie et al. |
| 2014/0283076 A1 | 9/2014 | Muttik |
| 2014/0298419 A1 | 10/2014 | Boubez et al. |
| 2014/0349611 A1 | 11/2014 | Kant et al. |
| 2015/0006384 A1 | 1/2015 | Shaikh |
| 2015/0007312 A1 | 1/2015 | Pidathala et al. |
| 2015/0013006 A1 | 1/2015 | Shulman et al. |
| 2015/0013008 A1* | 1/2015 | Lukacs .................. G06F 21/53 726/24 |
| 2015/0039513 A1 | 2/2015 | Adjaoute |
| 2015/0074810 A1 | 3/2015 | Saher et al. |
| 2015/0082430 A1 | 3/2015 | Sridhara et al. |
| 2015/0089655 A1 | 3/2015 | Choi et al. |
| 2015/0096048 A1 | 4/2015 | Zhang et al. |
| 2015/0113616 A1 | 4/2015 | Sampas |
| 2015/0121524 A1 | 4/2015 | Fawaz et al. |
| 2015/0121529 A1 | 4/2015 | Quinlan et al. |
| 2015/0128206 A1 | 5/2015 | Haim et al. |
| 2015/0128246 A1 | 5/2015 | Feghali et al. |
| 2015/0143496 A1 | 5/2015 | Thomas et al. |
| 2015/0150125 A1 | 5/2015 | Dulkin et al. |
| 2015/0150130 A1 | 5/2015 | Fiala |
| 2015/0156214 A1 | 6/2015 | Kaminsky |
| 2015/0163121 A1 | 6/2015 | Mahaffey et al. |
| 2015/0172300 A1 | 6/2015 | Cochenour |
| 2015/0195291 A1 | 7/2015 | Zuk et al. |
| 2015/0199512 A1 | 7/2015 | Kim et al. |
| 2015/0200928 A1 | 7/2015 | Burch et al. |
| 2015/0205962 A1 | 7/2015 | Swidowski et al. |
| 2015/0220735 A1 | 8/2015 | Paithane et al. |
| 2015/0254161 A1 | 9/2015 | Baril et al. |
| 2015/0257194 A1 | 9/2015 | Cho |
| 2015/0264068 A1 | 9/2015 | Beauchesne |
| 2015/0264077 A1 | 9/2015 | Berger et al. |
| 2015/0268947 A1 | 9/2015 | Ionescu |
| 2015/0271200 A1 | 9/2015 | Brady et al. |
| 2015/0281267 A1 | 10/2015 | Danahy et al. |
| 2015/0286820 A1 | 10/2015 | Sridhara et al. |
| 2015/0288706 A1 | 10/2015 | Marshall |
| 2015/0310196 A1 | 10/2015 | Turgeman et al. |
| 2015/0326587 A1 | 11/2015 | Vissamsetty et al. |
| 2015/0326588 A1 | 11/2015 | Vissamsetty et al. |
| 2015/0326592 A1 | 11/2015 | Vissamsetty et al. |
| 2015/0326599 A1 | 11/2015 | Vissamsetty et al. |
| 2015/0350236 A1 | 12/2015 | Klinghofer et al. |
| 2015/0358345 A1 | 12/2015 | Clark et al. |
| 2015/0370560 A1* | 12/2015 | Tan ..................... G06F 21/6209 717/148 |
| 2015/0373039 A1 | 12/2015 | Wang |
| 2015/0381376 A1 | 12/2015 | Wardman et al. |
| 2016/0028750 A1 | 1/2016 | Di Pietro et al. |
| 2016/0042179 A1 | 2/2016 | Weingarten |
| 2016/0042180 A1 | 2/2016 | Sayre et al. |
| 2016/0055334 A1 | 2/2016 | Herwono et al. |
| 2016/0055337 A1 | 2/2016 | El-Moussa |
| 2016/0072838 A1 | 3/2016 | Kolton et al. |
| 2016/0078365 A1 | 3/2016 | Baumard |
| 2016/0080414 A1 | 3/2016 | Kolton et al. |
| 2016/0127352 A1 | 5/2016 | Xu et al. |
| 2016/0127413 A1 | 5/2016 | Kraitsman et al. |
| 2016/0142399 A1 | 5/2016 | Pace et al. |
| 2016/0191554 A1 | 6/2016 | Kaminsky |
| 2016/0212225 A1 | 7/2016 | Smith et al. |
| 2016/0261631 A1 | 9/2016 | Vissamsetty et al. |
| 2016/0285914 A1 | 9/2016 | Singh et al. |
| 2016/0315909 A1 | 10/2016 | Von Gravrock et al. |
| 2016/0323300 A1 | 11/2016 | Boss et al. |
| 2016/0323316 A1 | 11/2016 | Kolton et al. |
| 2016/0381023 A1 | 12/2016 | Dulce et al. |
| 2017/0019425 A1 | 1/2017 | Ettema et al. |
| 2017/0026387 A1 | 1/2017 | Vissamsetty et al. |
| 2017/0032122 A1 | 2/2017 | Thakar et al. |
| 2017/0054754 A1 | 2/2017 | Saher et al. |
| 2017/0093910 A1 | 3/2017 | Gukal et al. |
| 2017/0126718 A1 | 5/2017 | Baradaran et al. |
| 2017/0134405 A1 | 5/2017 | Ahmadzadeh et al. |
| 2017/0141980 A1 | 5/2017 | Palanciuc et al. |
| 2017/0147796 A1 | 5/2017 | Sardesai et al. |
| 2017/0149787 A1 | 5/2017 | Niemela et al. |
| 2017/0149795 A1 | 5/2017 | Day, II |
| 2017/0149832 A1 | 5/2017 | Touboul et al. |
| 2017/0171244 A1 | 6/2017 | Vissamsetty et al. |
| 2017/0180421 A1 | 6/2017 | Shieh et al. |
| 2017/0206357 A1 | 7/2017 | Gorelik et al. |
| 2017/0230384 A1 | 8/2017 | Touboul et al. |
| 2017/0230402 A1 | 8/2017 | Greenspan et al. |
| 2017/0235967 A1 | 8/2017 | Ray et al. |
| 2017/0244729 A1 | 8/2017 | Fahrny et al. |
| 2017/0244749 A1 | 8/2017 | Shulman et al. |
| 2017/0244755 A1 | 8/2017 | Tsao |
| 2017/0264639 A1 | 9/2017 | Sama et al. |
| 2017/0279846 A1 | 9/2017 | Osterweil et al. |
| 2017/0286676 A1 | 10/2017 | Weingarten et al. |
| 2017/0302458 A1 | 10/2017 | Berger et al. |
| 2017/0302653 A1 | 10/2017 | Ortner et al. |
| 2017/0302665 A1 | 10/2017 | Zou et al. |
| 2017/0302696 A1 | 10/2017 | Schutz et al. |
| 2017/0318054 A1 | 11/2017 | Vissamsetty et al. |
| 2017/0322959 A1 | 11/2017 | Tidwell et al. |
| 2017/0324774 A1 | 11/2017 | Ohayon et al. |
| 2017/0324777 A1 | 11/2017 | Ohayon et al. |
| 2017/0331849 A1 | 11/2017 | Yu et al. |
| 2017/0331856 A1 | 11/2017 | Vissamsetty et al. |
| 2017/0346802 A1 | 11/2017 | Gruskin et al. |
| 2017/0346853 A1 | 11/2017 | Wyatt et al. |
| 2017/0359370 A1 | 12/2017 | Humphries et al. |
| 2018/0013788 A1 | 1/2018 | Vissamsetty et al. |
| 2018/0020005 A1 | 1/2018 | Beiter et al. |
| 2018/0027006 A1 | 1/2018 | Zimmermann et al. |
| 2018/0027017 A1 | 1/2018 | Touboul et al. |
| 2018/0039776 A1 | 2/2018 | Loman et al. |
| 2018/0048665 A1 | 2/2018 | Shulman et al. |
| 2018/0063187 A1 | 3/2018 | St Pierre |
| 2018/0089430 A1 | 3/2018 | Mayo |
| 2018/0143915 A1 | 5/2018 | Gonzalez et al. |
| 2018/0146008 A1 | 5/2018 | Vissamsetty et al. |
| 2018/0173876 A1 | 6/2018 | Vissamsetty et al. |
| 2018/0183815 A1 | 6/2018 | Enfinger |
| 2018/0248896 A1 | 8/2018 | Challita et al. |
| 2019/0042745 A1 | 2/2019 | Chen et al. |
| 2019/0052659 A1 | 2/2019 | Weingarten et al. |
| 2019/0068642 A1 | 2/2019 | Araujo et al. |
| 2019/0073475 A1 | 3/2019 | Vissamsetty et al. |
| 2019/0114426 A1 | 4/2019 | Cohen et al. |
| 2019/0253453 A1 | 8/2019 | Vissamsetty et al. |
| 2019/0354355 A1 | 11/2019 | Jacobson et al. |
| 2019/0379697 A1 | 12/2019 | Vissamsetty et al. |
| 2020/0143054 A1 | 5/2020 | Cohen et al. |
| 2020/0218806 A1 | 7/2020 | Cho |
| 2020/0252429 A1 | 8/2020 | Vissamsetty et al. |

(56) References Cited

U.S. PATENT DOCUMENTS

| | | | |
|---|---|---|---|
| 2020/0374087 | A1 | 11/2020 | Vissamsetty et al. |
| 2021/0073374 | A1* | 3/2021 | Mookken ............... G06F 21/54 |
| 2021/0397710 | A1 | 12/2021 | Cohen et al. |

FOREIGN PATENT DOCUMENTS

| | | |
|---|---|---|
| EP | 3 171 568 | 5/2017 |
| JP | 2016-512631 | 4/2016 |
| JP | 2017-504102 | 2/2017 |
| KR | 10-2015-0101811 | 9/2015 |
| KR | 10-1969572 | 4/2019 |
| WO | WO 02/27440 A2 | 4/2002 |
| WO | WO 2010/030169 A2 | 3/2010 |
| WO | WO 2012/027669 | 3/2012 |
| WO | WO 2013/014672 | 1/2013 |
| WO | WO 2015/171780 A1 | 11/2015 |
| WO | WO 2015/171789 A1 | 11/2015 |
| WO | WO 2016/024268 | 2/2016 |
| WO | WO 2016/081561 A1 | 5/2016 |
| WO | WO 2017/064710 | 4/2017 |
| WO | WO 2019/092530 | 5/2019 |
| WO | WO 2019/032728 | 3/2020 |

OTHER PUBLICATIONS

Bert Abrath • Bart Coppens • Stijn Volckaert • Bjorn De Sutter; Obfuscating Windows DLLs; 2015 IEEE/ACM 1st International Workshop on Software Protection (pp. 24-30); (Year: 2015).*

AbdelHameed, M.U. • Sobh, M.A. • Eldin, A.M.B.; Portable executable automatic protection using dynamic infection and code redirection; 2009 International Conference on Computer Engineering & Systems (pp. 501-507); (Year: 2009).*

Barbhuiya et al., "Detection of neighbor solicitation and advertisement spoofing in IPv6 neighbor discovery protocol." Proceedings of the 4th international conference on Security of information and networks. (2011).

Chen et al., "MitM attack by name collision: Cause analysis and vulnerability assessment in the new gTLD era." Security and Privacy (SP), 2016 IEEE Symposium on. IEEE (2016).

Dini et al., "Probabilistic Contract Compliance for Mobile Applications", Eighth International Conference on Availability, Reliability and Security (ARES) IEEE, Sep. 2-6, 2013, pp. 599-606.

Gu et al., "Malicious Shellcode Detection with Virtual Memory Snapshots," 2010 Proceedings IEEE INFOCOM, San Diego, CA, 2010, pp. 1-9, accessed Mar. 6, 2019.

Installing a Tanium Client—distributed also using user/password (not encrypted) from a hosted Module server, downloaded from https://docs.tanium.com/client/client/deployment.html#client_management on Apr. 1, 2021.

IBM Software, "Stepping up the battle against advanced threats", IBM Trusteer Apex Thought Leadership White Paper, Dec. 2013, WGW03043-USEN-00.

"IBM Security Qradar SIEM Installation Guide" downloaded from http://www.siem.su/docs/ibm/Installation_and_updating/IBM_Security_QRadar_installation_Guide.pdf, printed 2013, vol. 7.2 in 54 pages.

IBM Security Guardium Insights for IBM Cloud Park for Security, printed from https://www.ibm.com/downloads/cas/QY1RYRLP, printed May 26, 2021 in 12 pages.

IBM Security Qradar Solutuion Brief "Visibility, detection, investigation and response" printed from https://www.ibm.com/downloads/cas/OP62GKAR, printed on May 26, 2021 in 11 pgs.

"IBM Security Trusteer Apex Advanced malware Protection (SaaS) delivers an enterprise endpoint security solution to help protect organizations from advanced malware and targeted attacks" downloaded from https://www-01.ibm.com/common/ssi/rep_ca/0/877/ENUSZP14-0390/ENUSZP14-0390.PDF, printed Aug. 5, 2014, in 9 pgs.

IBM Guardium Documentation "Components and Topology", downloaded from https://www.ibm.com/docs/en/qsip/7.4?topic=deployment-qradar-architecture-overview, printed on Jun. 8, 2021 in 3 pages.

IBM Software "Stepping up the battle against advanced threats", downloaded from https://citrixready.citrix.com/content/dam/ready/partners/ib/ibm-global-services/ibm-security-trusteer-apex-advanced-malware-protection/wgw03043usen.pdf, Printed Dec. 2013 in 12 pages.

Laureano et al., M., "Intrusion detection in virtual machine environments. In Euromicro Conference, 2004. Proceedings." 30th (pp. 520-525). IEEE Sep. 30, 2004.

Liu et al., "Detecting Trojan Horses Based on System Behavior Using Machine Learning Method", International Conference on Machine Learning and Cybernetics (ICMLC), IEEE, Jul. 11-14, 2010, pp. 855-860.

IBM, "Qradar Architecture overview", downloaded from https://www.ibm.com/docs/en/qsip/7.4?topic=deployment-qradar-architecture-overview printed May 28, 2021 in 6 pgs.

Moussaileb et al., "Ransomware's Early Mitigation Mechanisms," Proceedings ARES 2018 Proceedings of the 13th International Conference on Availability, Reliability and Security Article No. 2, pp. 1-10 (2018).

Ornaghi et al., "Man in the middle attacks." Blackhat Conference Europe (2003).

Ramachandran et al., "Detecting ARP spoofing: An active technique." International Conference on Information Systems Security, Springer, Berlin, Heidelberg (2005).

Rüdiger Schollmeier, A Definition of Peer-to-Peer Networking for the Classification of Peer-to-Peer Architectures and Applications, Proceedings of the First International Conference on Peer-to-Peer Computing, IEEE (2002).

Shosha et al., A.F., "Evasion-resistant malware signature based on profiling kernel data structure objects." In 2012 7th International Conference on Risks and Security of Internet and Systems (CRISIS) (pp. 1-8). IEEE., Oct. 31, 2012.

Tanium™ Client Management 1.6 User Guide, downloaded from https://docs.tanium.com/client_management/client_management/index.html on Apr. 1, 2021.

Ullrich et al., "IPv6 Security: Attacks and Countermeasures in a Nutshell." 8th USENIX Workshop on Offensive Technologies (2015).

Xu, J-Y; Sung, A.H .; Chavez, P.; Mukkamala, S.; "Polymorphic Malicious Executable Scanner by API Sequence Analysis", Fourth International Conference on Hybrid Intelligent Systems, IEEE Dec. 5-8, 2004, pp. 378-383.

Communication Pursuant to Article 94(3) EPC dated Dec. 11, 2018 for European Application 15 760 520.5, in 7 pages.

Extended European Search Report dated May 9, 2019 for Application No. 16855062.2, in 7 pages.

European Search Report dated Apr. 29, 2021 in European Patent Application No. 18844671 in 38 pages.

Extended European Search Report dated Jan. 25, 2021 for European Patent Application No. 20181537.0, in 10 pages.

Reaqta Hive, A.I. Based Endpoint Threat Response, Whitepaper, 27 pages (Apr. 6, 2017).

International Search Report and Written Opinion dated Feb. 18, 2016 for International Application No. PCT/IL2015/050802, in 10 pages.

International Preliminary Report on Patentability dated Feb. 14, 2017 for International Application No. PCT/IL2015/050802, in 7 pages.

International Search Report and Written Opinion dated Apr. 20, 2017 for International Application No. PCT/IL2016/051110, in 10 pages.

International Search Report and Written Opinion dated Dec. 11, 2018 for International Application No. PCT/US2018/045850, in 12 pages.

International Search Report and Written Opinion dated Aug. 24, 2020 for International Application No. PCT/US2020/033872, in 8 pages.

International Search Report issued in application No. PCT/US2021/050129 dated Dec. 21, 2021.

International Search Report in corresponding International Patent Application No. PCT/US2015/29490, dated Aug. 7, 2015, in 2 pages.

(56) References Cited

OTHER PUBLICATIONS

Written Opinion in corresponding International Patent Application No. PCT/US2015/29490, dated Aug. 7, 2015, in 6 pages.
International Preliminary Report on Patentability in corresponding International Patent Application No. PCT/US2015/29490, dated Nov. 8, 2016, in 7 pages.
International Search Report in corresponding International Patent Application No. PCT/US2015/29501, dated Aug. 7, 2015, in 2 pages.
Written Opinion in corresponding International Patent Application No. PCT/US2015/29501, dated Aug. 7, 2015, in 6 pages.
International Preliminary Report on Patentability in corresponding International Patent Application No. PCT/US2015/29501, dated Nov. 8, 2016, in 7 pages.
International Search Report in corresponding International Patent Application No. PCT/US2015/61271, dated Feb. 2, 2016, in 2 pages.
Written Opinion in corresponding International Patent Application No. PCT/US2015/61271, dated Feb. 2, 2016, in 6 pages.
International Preliminary Report on Patentability in corresponding International Patent Application No. PCT/US2015/61271, dated May 23, 2017, in 7 pages.
Office Action dated Jul. 24, 2019 in European Patent Application No. 15760520.5, in 8 pages.
Office Action dated May 31, 2022 in Japanese Patent Application No. 2020-503272, in 7 pages.
Extended European Search Report dated Aug. 25, 2021 for European Patent Application No. 21162973.8, in 5 pages.

\* cited by examiner

PRESERVING DLL HOOKS

BACKGROUND

A dynamic link library (DLL) includes commonly used functions that are linked with an application when it is loaded into memory. Addresses of the functions of the DLL in memory are provided to the application upon instantiation. Typically, a DLL is provided as part of the operating system. In some instances, security software may substitute modified functions in the place of one or more functions of a dynamic link library (DLL). The substitution of a security function in the place of a standard DLL function may be referred to as a "DLL hook."

BRIEF SUMMARY OF THE INVENTION

The systems and methods disclosed herein provide an improved approach for implementing DLL hooks. In one embodiment, a security DLL may be associated with a native DLL that is redirected to the security DLL, where the security DLL performs a threat mitigation function and the native DLL is restricted from performing such a function.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1A:
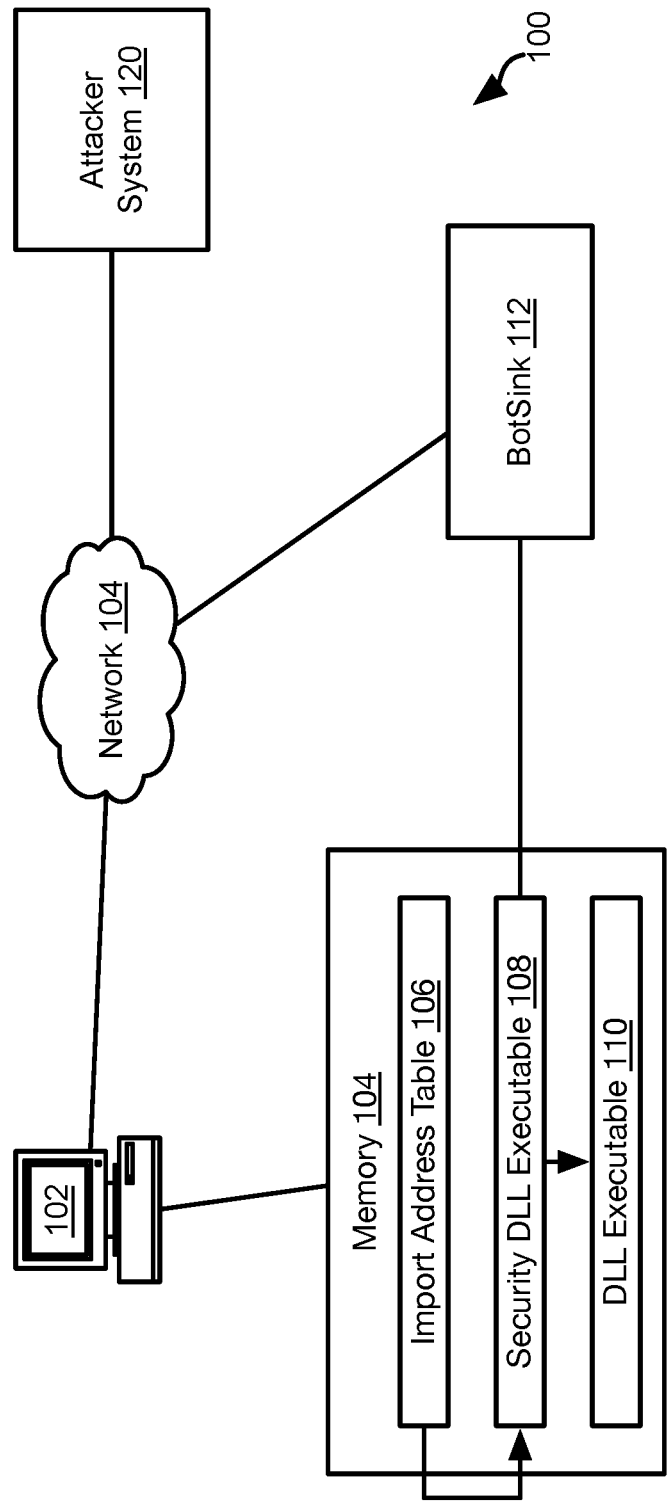
FIGS. 1A to 1C are schematic block diagrams of network environments for performing methods in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1A, the methods disclosed herein may be practiced in a network environment 100 including a computer system 102 connected to a network, such as the Internet, local area network (LAN), wide area network (WAN), or other type of network. The computer system 102 may be a user endpoint, such as a desktop or laptop computer, tablet computer, smartphone, wearable computing device, or other type of computing device.

An application executing on a computer system and stored in memory 104 may include import address table (IAT) 106. Each memory location in the IAT 106 may refer to the starting address in the memory 104 of a dynamic link library (DLL) function. As known in the art, a DLL is a set of functions used by multiple applications. Applications are incorporate the DLL and make calls to the functions of the DLL but need not include the executables for the functions. Instead, when the application is loaded into memory, the IAT 106 is used to link the application to the locations of the DLL executables 110. When a call to a DLL function is generated by the application, the application invokes the DLL executable 110 pointed to in the entry of the IAT 106 corresponding to that DLL function.

A security application, such as an anti-virus, anti-malware, or deception-based security application, may substitute or augment the functionality of a given DLL executable 110. For example, an IAT DLL hook may be implemented whereby an entry in the IAT 106 referencing the starting address of the DLL executable 110 is modified to refer to a security DLL executable 108 that may either replace the functionality of the executable 110 or perform security functions followed by invoking execution of the DLL executable.

In some embodiments, the security DLL executable 108 may operate in combination with a BotSink 112 to provide deception-based security. The BotSink 112 may create the DLL hook to the security DLL executable 108 and/or execution of the security DLL executable 108 may result in exchange of information with the BotSink 112. It shall be understood that the system for protecting DLL hooks may be used with any system implementing DLL hooks.

The BotSink 112 either alone or with use of DLL hooks may implement any of the method for detecting and engaging malicious code disclosed in the applications of Table 1 (herein after "the incorporated applications"), which are hereby incorporated herein by reference in their entirety.

TABLE 1

Incorporated Applications

| Filing Date | Serial Number | Title |
| --- | --- | --- |
| Nov. 7, 2013 | 14/074,532 | Methods and Apparatus for Redirecting Attacks on a Network |

TABLE 1-continued

Incorporated Applications

| Filing Date | Serial Number | Title |
| --- | --- | --- |
| May 7, 2014 | 61/989,965 | Distributed System for Bot Detection |
| Aug. 12, 2014 | 14/458,065 | Emulating Successful Shellcode Attacks |
| Aug. 12, 2014 | 14/458,026 | Distributed System for Bot Detection |
| Aug. 22, 2014 | 14/466,646 | Evaluating URLS For Malicious Content |
| Nov. 20, 2014 | 14/549,112 | System And Method For Directing Malicious Activity To A Monitoring System |
| Jul. 21, 2015 | 14/805,202 | Monitoring Access Of Network Darkspace |
| Dec. 10, 2015 | 14/965,574 | Database Deception In Directory Services |
| Apr. 29, 2016 | 15/142,860 | Authentication Incident Detection and Management |
| May 12, 2016 | 15/153,471 | Luring Attackers Towards Deception Servers |
| May 17, 2016 | 15/157,082 | Emulating Successful Shellcode Attacks |
| Jul. 7, 2016 | 15/204,779 | Detecting Man-In-The-Middle Attacks |
| Nov. 23, 2016 | 15/360,117 | Implementing Decoys in Network Endpoints |
| Dec. 19, 2016 | 15/383,522 | Deceiving Attackers in Endpoint Systems |
| Sep. 5, 2017 | 15/695,952 | Ransomware Mitigation System |
| Feb. 9, 2018 | 15/893,176 | Implementing Decoys In A Network Environment |
| May 22, 2019 | 16/420,074 | Deceiving Attackers in Endpoint Systems |
| May 31, 2019 | 201921021696 | Implementing Decoys in a Network Environment |
| Aug. 16, 2019 | 16/543,189 | Deceiving Attackers Accessing Active Directory Data |
| Apr. 15, 2020 | 16/849,813 | Deceiving Attackers Accessing Network Data |

In any of the incorporated applications, where operating system commands are intercepted or modified, DLL hooks may be used. For example, U.S. application Ser. No. 15/383, 522 describes a system that intercepts certain operating system commands to determine whether the commands reference protected data. The interception of these commands may be implemented by DLL hooks substituted for DLL executables for these commands. In another example, U.S. application Ser. No. 15/695,952 describes a system that modifies file system commands to mitigate ransomware attacks. File system commands may be modified by using a DLL hook to replace a file system command executable with a modified DLL executable performing the modified file system commands.

The computer system 102 may be infiltrated by an attacker system 120 accessing the computer system 102 by means of the network 104 or an executable operating in the computer system 102. An attacker system may seek to probe defensive measures implemented on the computer system 102, including the existence of DLL hooks. This may include rewriting the IAT 106 to ensure that all entries refer to their corresponding DLL executables 110 or evaluating the executable code referenced by entries in the IAT 106 to ensure that the executable code match the expected DLL executable 110 for a given operating system vendor or other source. The systems and methods disclosed herein hinder such attempts as described in detail below.

Figure 1B:
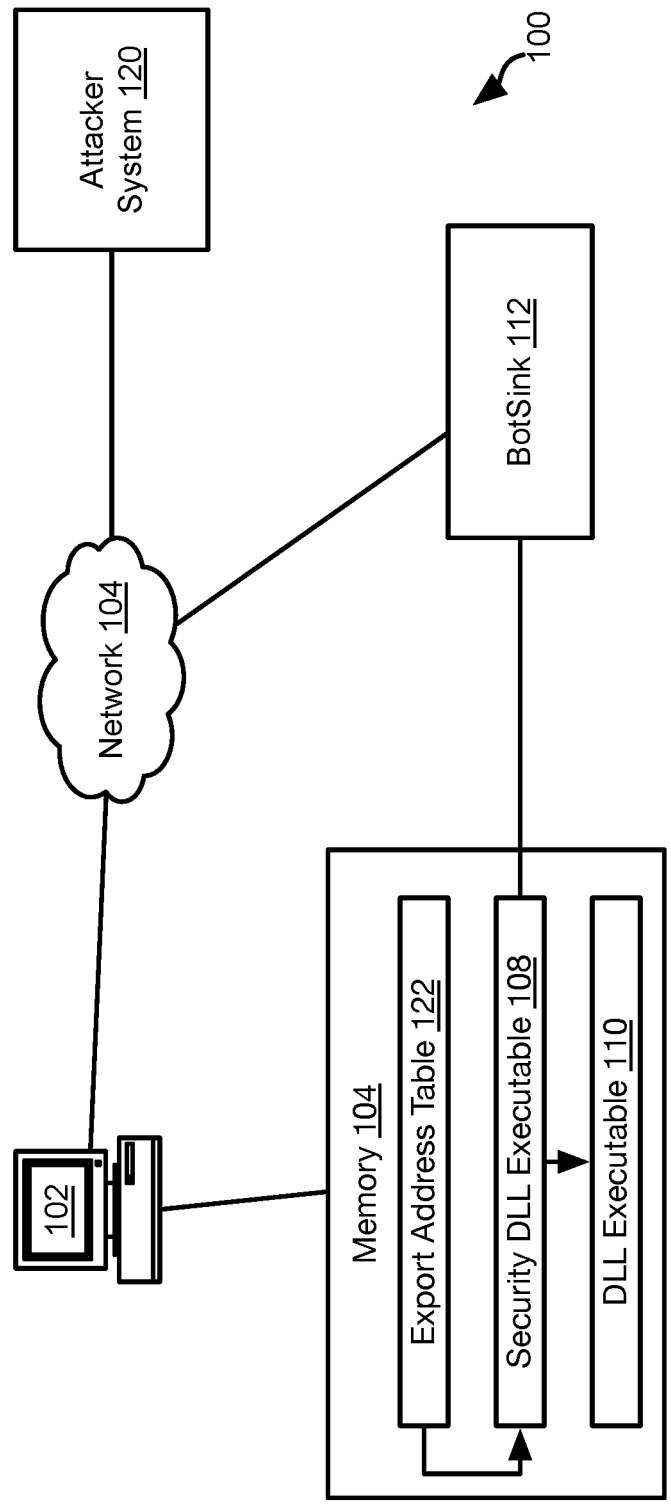

FIG. 1B illustrates an export address table (EAT) DLL hook. An EAT DLL hook may be implemented by modifying the export address table 122 may include modifying the EAT of a DLL such that a reference to the starting address (memory address storing the first instruction) of the DLL executable 110 is replaced with the starting address of the security DLL executable 108. In particular, the EAT 122 of a DLL may map each function name to an offset address relative to a starting address of the DLL. The offset address may be replaced with the starting address of the DLL. In this manner, when an application is linked with the DLL, the IAT 106 will associate the starting address of the security DLL with the function name.

Figure 1C:
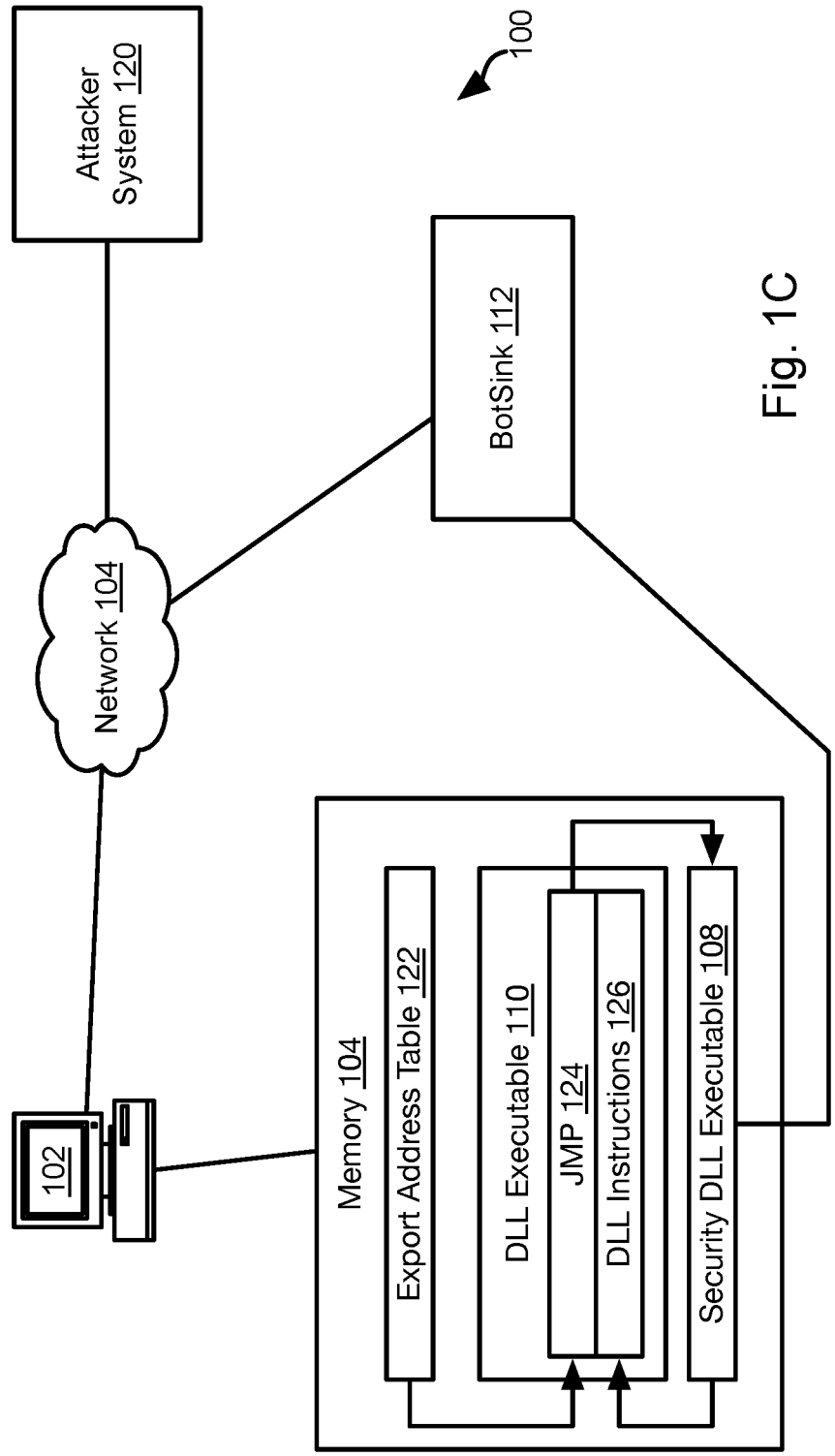

FIG. 1C illustrates an inline DLL hook. The EAT 122 or IAT 106 stores pointers mapping a function name to the starting address of the DLL executable 110. The instruction stored at the starting address (or any of the first N instructions stored at the first N memory locations including and following the starting address) is modified to include a jump (JMP) instruction 124 that instructs an executing processor to continue execution at an address referenced by the JMP instruction 124, that address being the starting address of the security DLL executable 108. The security DLL executable 108 may replace the DLL executable 110 or may include a JMP instruction back to the DLL executable 110.

Figure 2A:
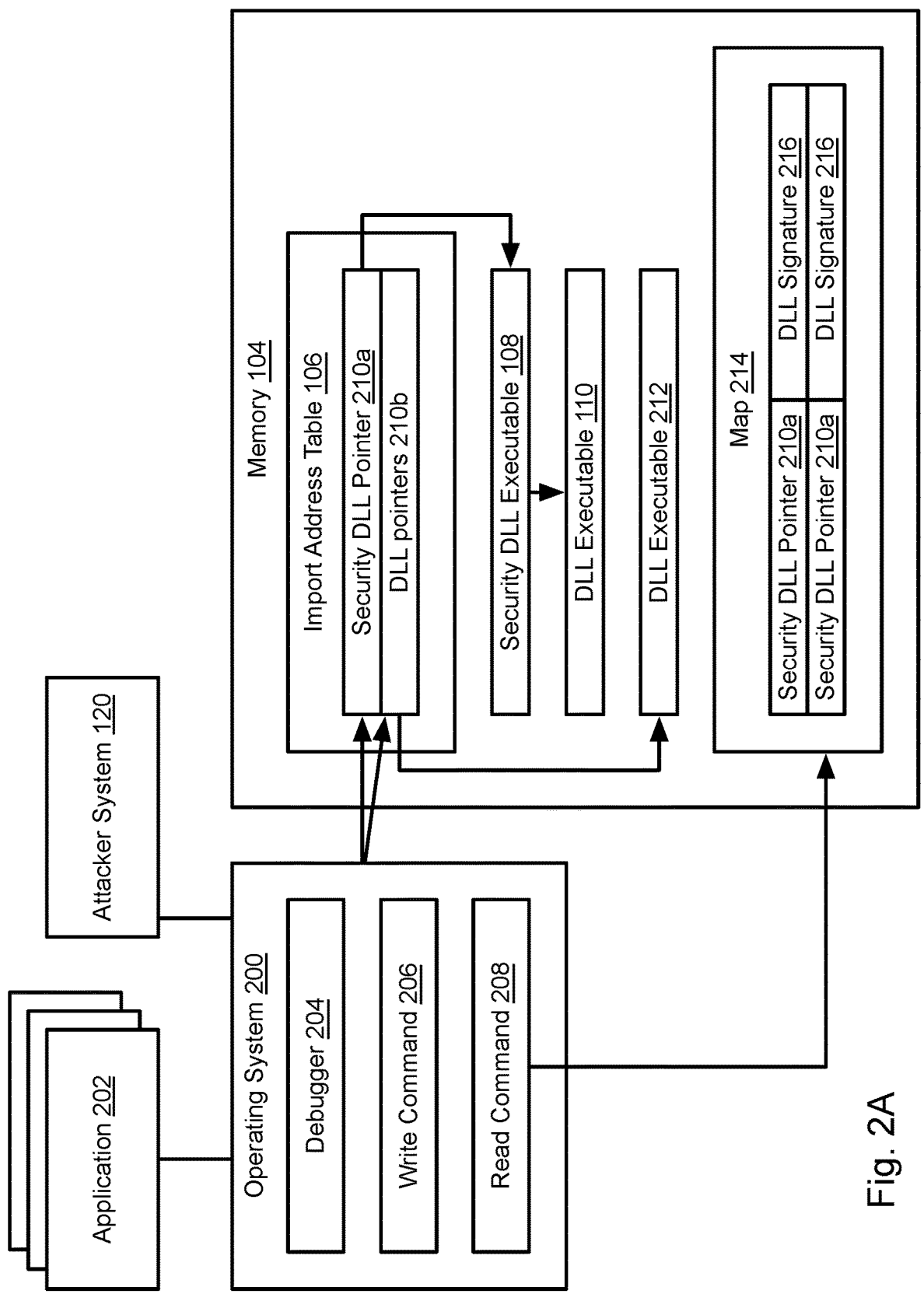
FIGS. 2A to 2C are schematic block diagrams illustrating components for protecting DLL hooks in accordance with an embodiment of the present invention.

Referring to FIG. 2A, applications 202 on the computer system 102 may operate in the context of an operating system 200. The applications 202 may make calls to DLL functions through the operating system 200. The operating system 200 may also include functionality such as a debugger 204 or functions that may be used by a debugger (e.g., placing of break points, inspection of memory). The operating system 200 may further include tools enabling reading from or writing to address locations in the memory 104. These tools may be tools used by a debugger or administrator and may include at least a write command executable 206 and a read command executable 208. For example, the command executable may include windbg debugger controls such as bp (inserts break point instruction), eb (edit/modify bytes at a given address with a given value), uf (un-assemble instructions at a given address), or db (dumps bytes at a given address). As described in greater detail below, each of the write command executable 206 and read command executable 208 may be modified to function according to the methods described herein.

For IAT hooks, the memory 104 may include the IAT 106 including one or more security DLL pointers 210a and possibly one or more DLL pointers 210b that point to a DLL executable 212 as specified by an operating system vendor or other source of the DLL. As outlined above, the DLL pointers 210a may point to a security DLL executable 108. Each DLL executable 108 may completely replace a DLL executable 110 such that the DLL executable 110 is not invoked. Alternatively, each DLL executable 108 may call the DLL executable 110 that it replaces.

The replacement of a pointer to a DLL executable 110 with security DLL pointers 210a may be performed by a software module referred to herein as "the DLL hook module," which may be the BotSink 112, an agent of the BotSink 112 executing on the computer system 102, or other executable code configured to cause performance of the functions of the DLL hook module described herein.

Before, during, or after modification of the IAT 106 to include the one or more security DLL pointers 210a, the DLL hook module may create a map 214. The map 214 may be stored in the memory 104, a persistent storage device (e.g., hard drive, NAND drive, etc.), or other storage device hosted by the computer system 102. Each entry of the maps 214 may include a security DLL pointer 210a, i.e. the starting address of a security DLL executable 108, and a DLL signature 216. The DLL signature 216 may be a representation of the DLL executable 110 referenced by an entry in the IAT 106 replaced by the security DLL pointer 210a mapped to the DLL signature 216 in the map 214.

The DLL signature 216 may be a portion of the DLL executable 110, such as the first N instructions of the DLL executable 110, where N is a predetermined integer greater than or equal to one, such as 5, 10, 100, 1 kB, or other some other value. The signature 216 may also be a hash or other representation of the entire DLL executable 110 or the first N instructions of the DLL executable 110.

Figure 2B:
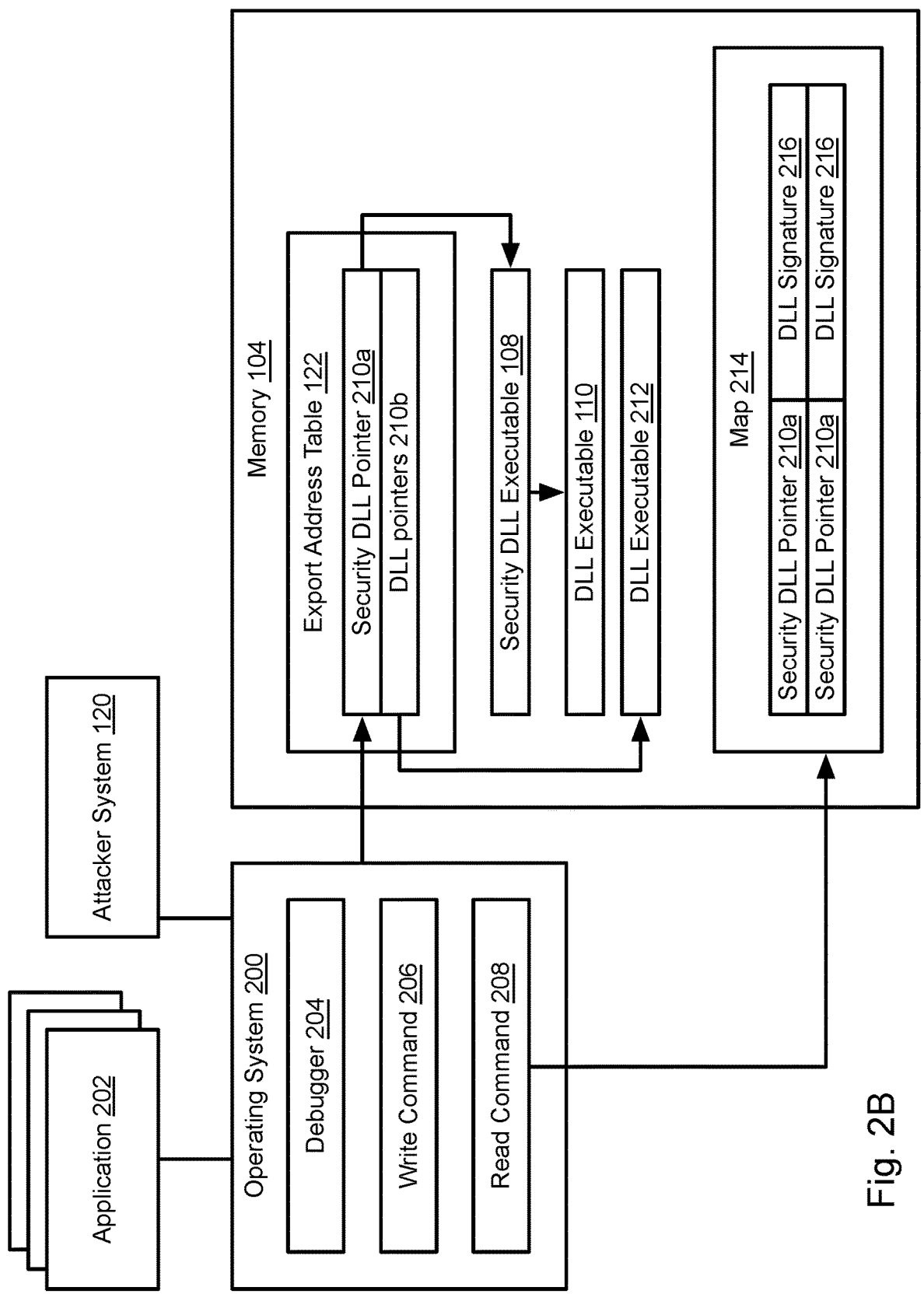
Figure 2C:
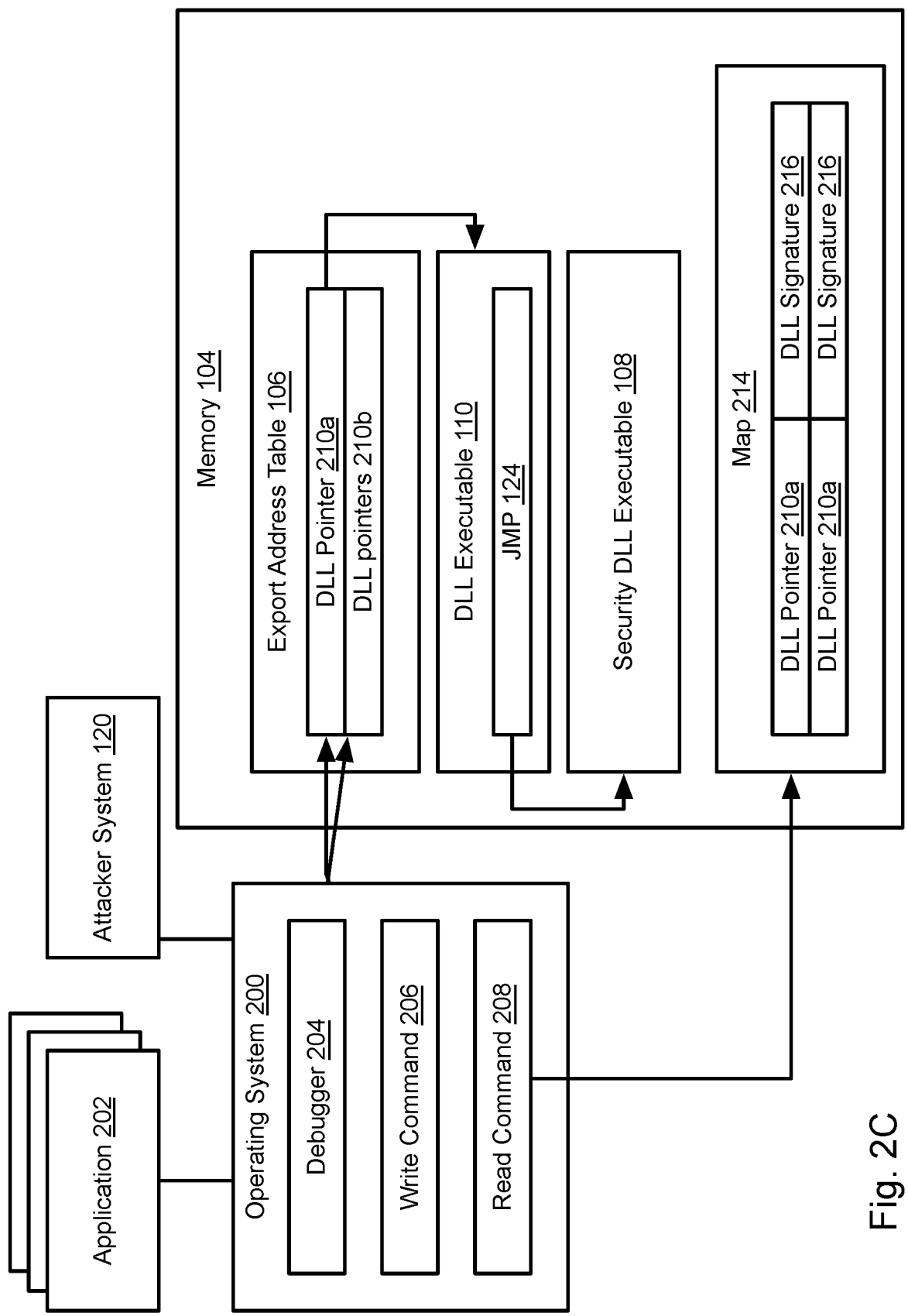

FIGS. 2B and 2C illustrate implementations of EAT and inline DLL hooks, respectively. As shown in FIG. 2B, the EAT table 122 is modified to include a security DLL pointer 210a that stores the starting address of the security DLL executable 108. Upon creation of an EAT hook, the map 214 is updated as for an IAT hook: each entry includes a security DLL pointer 210a that stores the first address of the security DLL executable 108 and a DLL signature 216 for the DLL executable 210 replaced by the security DLL executable 108.

As shown in FIG. 2C, the JMP instruction in the modified DLL executable points to the starting address of the security DLL executable 108 following creation of the inline hook. The map 214 is updated in the same manner as for other types of hooks: each entry includes a security DLL pointer 210a that stores the first address of the security DLL executable 108 and a DLL signature 216 for the DLL executable 210 replaced by the security DLL executable 108. The DLL signature 216 is the signature of the DLL prior to modification to include the JMP instruction 124.

Figure 3:
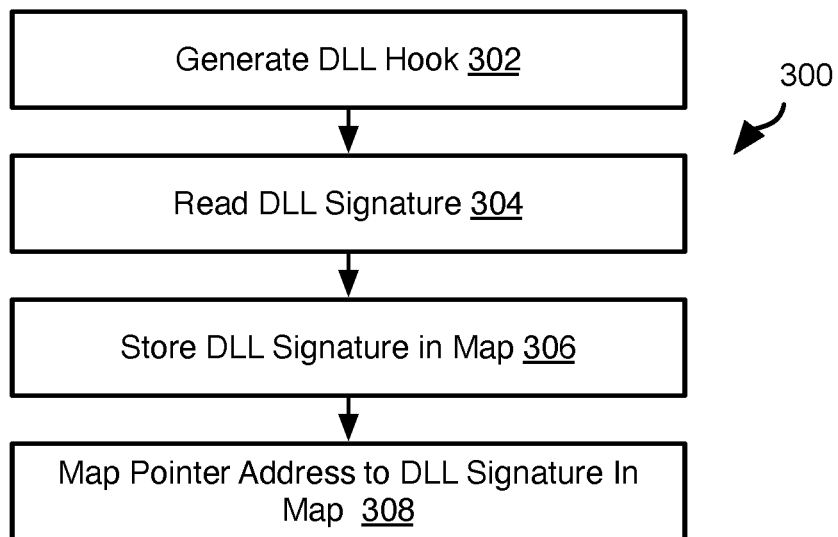
FIG. 3 is a process flow diagram of a method for generating protectable DLL hooks in accordance with an embodiment of the present invention.

FIG. 3 illustrates a method 300 that may be executed by the DLL hook module. The method 300 is described with respect to actions performed with one DLL hook such that the method 300 may be repeated for each DLL hook that is created. The method 300 may be used for IAT, EAT, and inline DLL hooks.

The method 300 includes generating 302 a DLL hook. As described above this may include modifying an original value at a location in the IAT 106 or EAT to store the starting address of a security DLL executable 108 or placing a JMP instruction in a DLL 110 that points to the starting address of the security DLL executable 108. The method 300 may include reading 304 a DLL signature of the DLL executable 110 that was referenced by the original value. As described above, this may include reading the first N instructions of the DLL executable. The method 300 may further include storing 306 the DLL signature in the map 214 and mapping 308 the starting address of the security DLL 108 to the DLL executable. As noted above, this may include creating an entry including two values: the first value including the starting address of the security DLL 108 and the second value including the DLL signature.

Figure 4A:
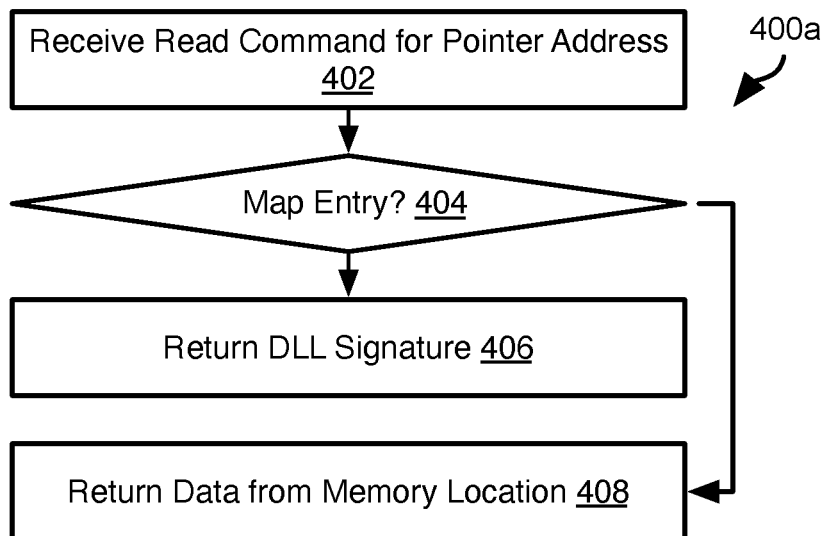
FIG. 4A is a process flow diagram of a method for preventing detection of DLL hooks in accordance with an embodiment of the present invention.

FIG. 4A illustrates a method 400a for hindering detection of DLL hooks. The method 400a may include receiving 402 a read command referencing an address in the memory 104. The read command is received from a source, such as an attacker system 120, and may invoke execution of the read command executable 208. The read command executable 208 may evaluate 404 whether the address referenced by the read command is included in an entry in the map 214. If so, the read command executable 208 may return 406 some or all of the DLL signature 216 mapped to the address referenced by the read command in the map 214. For example, the read command may specify a number of memory locations to read. Accordingly, that number of instructions from the DLL signature 216 may be returned to a source of the read command, such as by way of the operating system 200. As is apparent, the method 400a returns the instructions of the original DLL executable 110 and therefore prevents detection of the DLL hook.

If there is no entry in the map 214 including the address referenced by the read command, the read command executable 208 may read the data from the address or block of addresses referenced by the read command and return 408 the data to the source of the read command. In some instances, the read command may be blocked for other reasons, such as a determination that the source of the read command is malicious or unauthorized. The approach by which the source of the read command is determined to be malicious or unauthorized may be any known in the art or described in the incorporated applications.

Figure 4B:
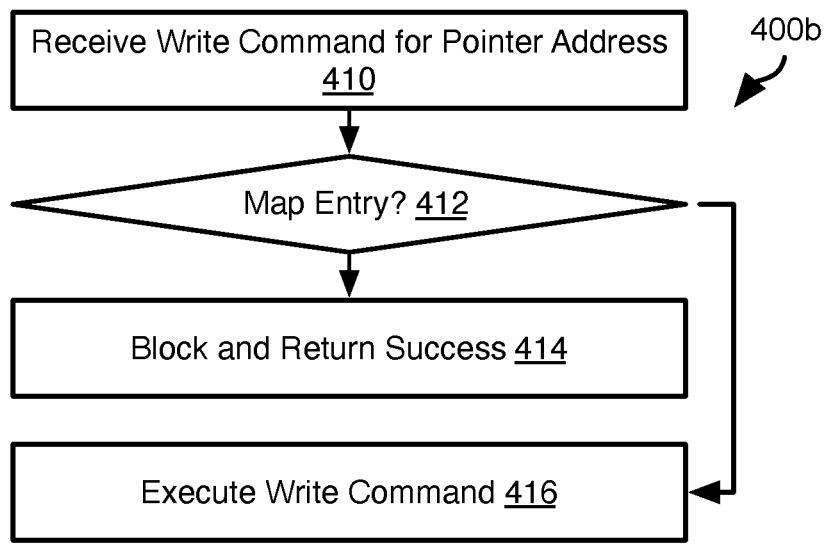
FIG. 4B is a process flow diagram of a method for preventing modification of DLL hooks in accordance with an embodiment of the present invention.

FIG. 4B illustrates a method 400b for hindering overwriting of DLL hooks to restore references to original DLL executables. The method 400b may include receiving 410 a write command referencing an address in the memory 104. The write command is received from a source, such as an attacker system 120, and may invoke execution of the write command executable 206. The write command executable 206 may evaluate 412 whether the address referenced by the write command is included in an entry in the map 214. If so, the write command executable 206 may block execution of the write command (e.g., ignore the write command) and return 414 confirmation of successful execution of the write command. As is apparent, the method 400b ensures that the security DLL executable 108 is not overwritten.

If there is no entry in the map 214 including the address referenced by the write command, the write command executable 206 may execute 416 the write command by writing data from the write command to the address or block of addresses referenced by the write command and returning acknowledgment of successful completion of the write command to the source of the write command. In some instances, the write command may be blocked for other reasons, such as a determination that the source of the write command is malicious or unauthorized. The approach by which the source of the write command is determined to be malicious or unauthorized may be any known in the art or described in the incorporated applications.

Figure 5:
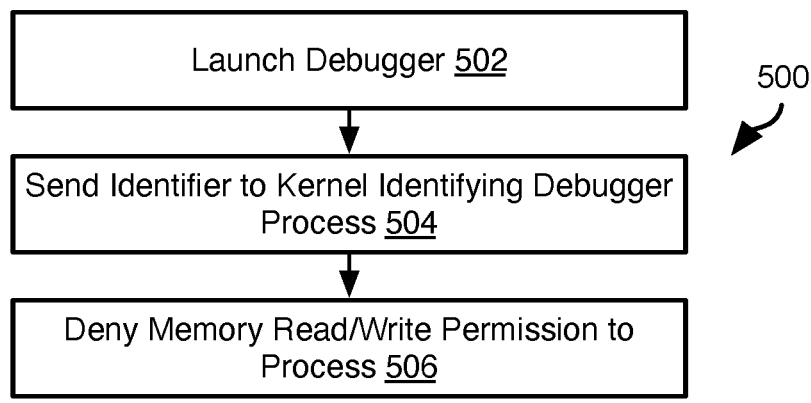
FIG. 5 is a process flow diagram of a method for handling use of a debugger in order to protect DLL hooks files in accordance with an embodiment of the present invention.

Referring to FIG. 5, detection of DLL hooks may further be prevented by modifying operation of debuggers executing on the computer system 102. In an operating system such as WINDOWS, LINUX, MACOS, or the like, the operating system may grant debugging privileges to particular executables. An operating system may additionally or alternatively set a flag or otherwise modify processes that have debugging privileges. Debugging privileges may include the ability to set break points, inspect operating system components, inspect memory contents, show intermediate results of functions, directly write to memory locations, and perform other debugging functions known in the art.

The method 500 may include the operating system 200 launching 502 a debugger, i.e. an application that has or requested debugging privileges from the operating system 200. An implementing software module that implements debugging functions may be modified by the BotSink 112, the DLL hook module, or other software component. In particular, the implementing software module may be modified such that in response to launching 502 of the debugger, the implementing software may send 504 an identifier to a kernel component. The identifier may be a process token defining the privileges of the debugger. The implementing software may be or include a hooked DLL or modified operating system function responsible for launching debuggers or granting debugging privileges. The implementing software may use an API (application programming interface) of the operating system 200 to obtain the token in response to detecting launching of the debugger.

In response to receiving the identifier, the kernel component may deny 506 privileges associated with the identifier. For example, the kernel component may monitor creation of handles for the process represented by the identifier, i.e. an object that may be used to reference and access the process in a WINDOWS operating system. In response to requests to create handles for the identifier, the kernel component may remove all access bits from the handle and just set the "PROCESS_QUERY_LIMITED_INFORMATION" bit. With this bit set, commands made using the handle cannot modify any aspect of the process as a debugger, including placement of breakpoints.

Additionally or alternatively, the implementing software may, in user mode, identify all known debuggers that the operating system 200 is configured to grant debugging privileges. The resource file of these debuggers may be evaluated to determine its internal name and this internal name may be passed to the kernel component. The kernel component may then remove debugging privileges from processes including the internal name, such as by modifying handle privileges as described above.

In addition to the approaches described above with respect to FIGS. 1 through 5, additional measures may be taken to prevent DLL hooks. For example, for hooks according to any of the foregoing embodiments, a name of each security DLL executable 108 in the loader descriptor table (LDR) may be replaced with the name of the DLL executable 110 replaced by that security DLL executable 108. In another example, the GetMappedFileName( ) executable may be itself hooked and replaced with a security DLL executable 108 that is programmed to modify results returned when the GetMappedFileName( ) function is called. For example, where the result of a call to GetMappedFileName( ) would result in the name of a security DLL executable 108, the name of the DLL executable 110 replaced by that security executable DLL 108 will be returned instead.

Figure 6:
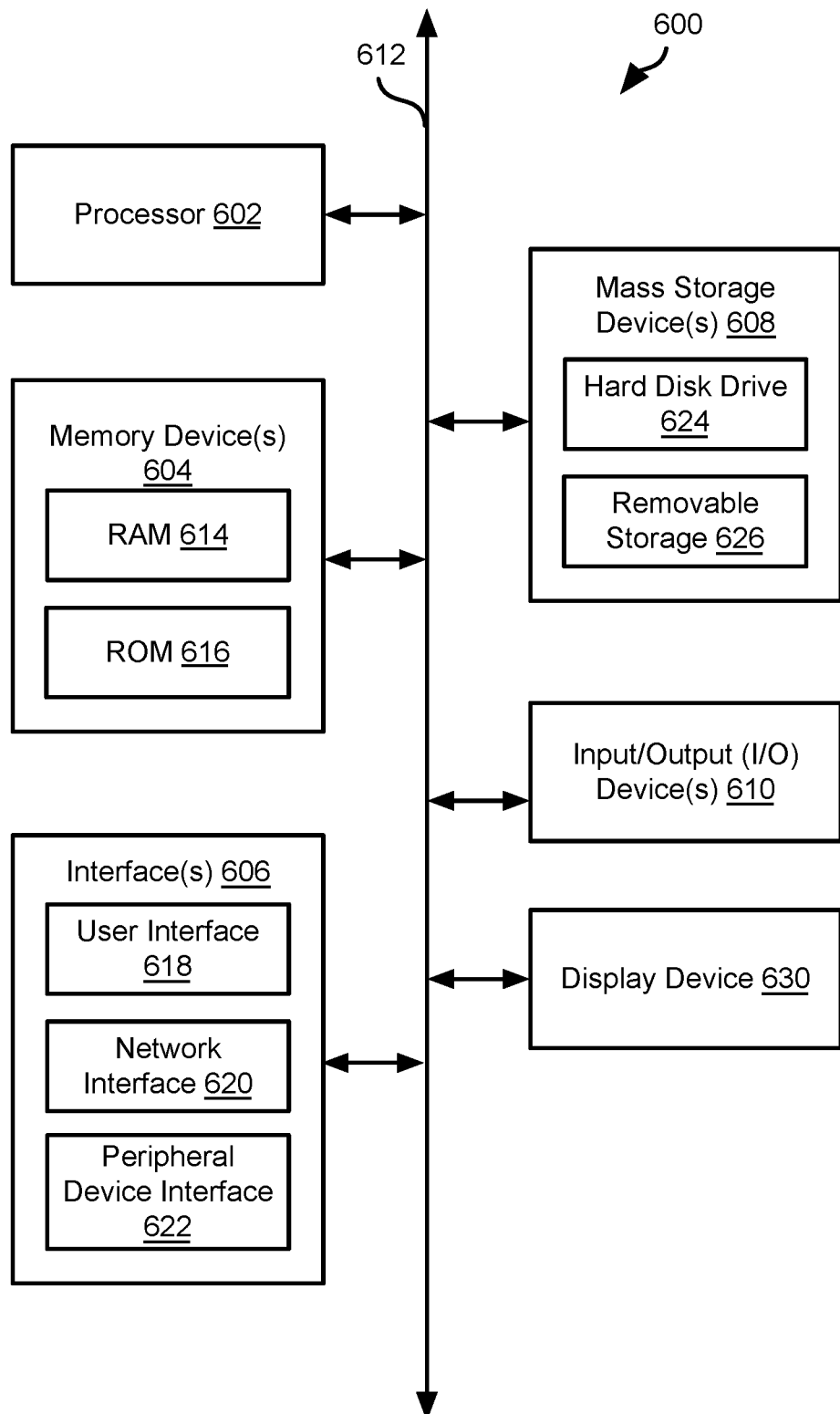
FIG. 6 is a schematic block diagram of a computer system suitable for implementing methods in accordance with embodiments of the present invention.

FIG. 6 is a block diagram illustrating an example computing device 600 which can be used to implement the system and methods disclosed herein. The computer system 102, BotSink 112, and attacker system 120 may have some or all of the attributes of the computing device 600. In some embodiments, a cluster of computing devices interconnected by a network may be used to implement any one or more components of the invention.

Computing device 600 may be used to perform various procedures, such as those discussed herein. Computing device 600 can function as a server, a client, or any other computing entity. Computing device can perform various monitoring functions as discussed herein, and can execute one or more application programs, such as the application programs described herein. Computing device 600 can be any of a wide variety of computing devices, such as a desktop computer, a notebook computer, a server computer, a handheld computer, tablet computer and the like.

Computing device 600 includes one or more processor(s) 602, one or more memory device(s) 604, one or more interface(s) 606, one or more mass storage device(s) 608, one or more Input/Output (I/O) device(s) 610, and a display device 630 all of which are coupled to a bus 612. Processor(s) 602 include one or more processors or controllers that execute instructions stored in memory device(s) 604 and/or mass storage device(s) 608. Processor(s) 602 may also include various types of computer-readable media, such as cache memory.

Memory device(s) 604 include various computer-readable media, such as volatile memory (e.g., random access memory (RAM) 614) and/or nonvolatile memory (e.g., read-only memory (ROM) 616). Memory device(s) 604 may also include rewritable ROM, such as Flash memory.

Mass storage device(s) 608 include various computer readable media, such as magnetic tapes, magnetic disks, optical disks, solid-state memory (e.g., Flash memory), and so forth. As shown in FIG. 6, a particular mass storage device is a hard disk drive 624. Various drives may also be included in mass storage device(s) 608 to enable reading from and/or writing to the various computer readable media. Mass storage device(s) 608 include removable media 626 and/or non-removable media.

I/O device(s) 610 include various devices that allow data and/or other information to be input to or retrieved from computing device 600. Example I/O device(s) 610 include cursor control devices, keyboards, keypads, microphones, monitors or other display devices, speakers, printers, network interface cards, modems, lenses, CCDs or other image capture devices, and the like.

Display device 630 includes any type of device capable of displaying information to one or more users of computing device 600. Examples of display device 630 include a monitor, display terminal, video projection device, and the like.

Interface(s) 606 include various interfaces that allow computing device 600 to interact with other systems, devices, or computing environments. Example interface(s) 606 include any number of different network interfaces 620, such as interfaces to local area networks (LANs), wide area networks (WANs), wireless networks, and the Internet. Other interface(s) include user interface 618 and peripheral device interface 622. The interface(s) 606 may also include one or more user interface elements 618. The interface(s) 606 may also include one or more peripheral interfaces such as interfaces for printers, pointing devices (mice, track pad, etc.), keyboards, and the like.

Bus 612 allows processor(s) 602, memory device(s) 604, interface(s) 606, mass storage device(s) 608, and I/O device(s) 610 to communicate with one another, as well as other devices or components coupled to bus 612. Bus 612 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 600, and are executed by processor(s) 602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The invention claimed is:

1. A method performed by a computer system, the method comprising:
  modifying memory to include a reference to a security dynamic link library (DLL) such that invocation of a function associated with a native DLL is redirected to the security DLL using the reference to the security DLL, the security DLL being different from the native DLL and invoking performance of a threat mitigation function that the native DLL is not programmed to perform;
  generating an entry in a mapping, wherein the entry comprises the reference to the security DLL and a representation of the native DLL;
  receiving, from a source, instructions referencing an address in memory; and
  restricting the address in memory from direct access by the source based on a determination that the address in memory corresponds to the entry in the mapping, wherein restricting the address in the one or more memory devices from direct access by the source comprises restricting access to the reference to the security DLL by modifying an operating system to restrict use of debugging privileges.

2. The method of claim 1, wherein the mapping is stored in memory.

3. The method of claim 1, wherein the representation of the native DLL is a first N lines of instructions of the native DLL, where N is an integer greater than or equal to one.

4. The method of claim 3, wherein the reference to the security DLL is a second address in memory.

5. The method of claim 4, wherein restricting the address in memory from direct access by the source comprises returning the first N lines of instructions of the native DLL in response to determining that a read reference received with the instructions matches the entry in the mapping.

6. The method of claim 4, wherein restricting the address in memory from direct access by the source comprises in response to determining that a write reference received with the instructions matches the entry in the mapping, refraining from writing data received with the instructions.

7. The method of claim 6, wherein restricting the address in memory from direct access by the source comprises in response to determining that a write reference received with the instructions matches the entry in the mapping, refraining from writing data received with the instructions while returning an indicator of successful writing of the data received with the instructions.

8. The method of claim 1, further comprising:
  detecting, by the computer system, launching of a debugging executable;
  passing, by the computer system, a reference to the debugging executable to a kernel of an operating system executing on the computer system; and
  withdrawing, by the computer system, debugging privileges from the reference to the debugging executable.

9. The method of claim 8, wherein the reference to the debugging executable is referenced by a handle and wherein withdrawing debugging privileges from the reference to the debugging executable comprises removing debugging privileges associated with a token included in the handle.

10. A system comprising one or more processing devices and one or more memory devices operably coupled to the one or more processing devices, the one or more memory devices storing executable code effective to cause the one or more processing devices to:
  modify memory to include a reference to a security dynamic link library (DLL) such that invocation of a function associated with a native DLL is redirected to the security DLL using the reference to the security, DLL, the security DLL being different from the native DLL and invoking performance of a threat mitigation function that the native DLL is not programmed to perform;

receive, from a source, instructions referencing an address in the one or more memory devices; and restrict the address in the one or more memory devices from direct access by the source based on a determination that the address in the one or more memory devices corresponds to the entry in the mapping, wherein restricting the address in the one or more memory devices from direct access by the source comprises restricting access to the reference to the security DLL by modifying an operating system to restrict use of debugging privileges.

11. The system of claim 10, wherein the mapping is stored in the one or more memory devices.

12. The system of claim 10, wherein the representation of the native DLL is a first N lines of instructions of the native DLL, where N is an integer greater than or equal to one.

13. The system of claim 12, wherein the reference to the security DLL is a second address in the one or more memory devices.

14. The system of claim 13, wherein restricting the address in the one or more memory devices from direct access by the source comprises returning the first N lines of instructions of the native DLL in response to determining that a read reference received with the instructions matches the entry in the mapping.

15. The system of claim 13, wherein restricting the address in the one or more memory devices from direct access by the source comprises in response to determining that a write reference received with the instructions matches the entry in the mapping, refraining from writing data received with the instructions.

16. The system of claim 15, wherein restricting the address in the one or more memory devices from direct access by the source comprises in response to determining that a write reference received with the instructions matches the entry in the mapping, refraining from writing data received with the instructions while returning an indicator of successful writing of the data received with the instructions.

17. The system of claim 10, wherein the executable code is further effective to cause the one or more processing devices to:

detect launching of a debugging executable;

pass a reference to the debugging executable to a kernel of an operating system; and withdraw debugging privileges from the reference to the debugging executable.

18. The system of claim 17, wherein:

the reference to the debugging executable is referenced by a handle; and the executable code is further effective to cause the one or more processing devices to withdraw debugging privileges from the reference to the debugging executable by removing debugging privileges associated with a token included in the handle.

\* \* \* \* \*